(12) United States Patent
Miltenberger

(10) Patent No.: US 6,889,576 B2
(45) Date of Patent: May 10, 2005

(54) METHOD OF PRODUCING A VEHICLE STEERING WHEEL AS WELL AS A VEHICLE STEERING WHEEL

(75) Inventor: Michael Miltenberger, Heusenstamm (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 89 days.

(21) Appl. No.: 09/996,274

(22) Filed: Nov. 28, 2001

(65) Prior Publication Data

US 2002/0062712 A1 May 30, 2002

(30) Foreign Application Priority Data

Nov. 29, 2000 (DE) .......................................... 100 59 133

(51) Int. Cl.⁷ ............................................... B62D 1/04
(52) U.S. Cl. .......................................... 74/552; 74/558
(58) Field of Search ................... 74/552, 558; 29/894.1

(56) References Cited

U.S. PATENT DOCUMENTS

| | | | | |
|---|---|---|---|---|
| 1,825,393 A | * | 9/1931 | Geyer | 74/552 |
| 3,530,739 A | * | 9/1970 | Meier | 74/552 |
| 3,576,139 A | | 4/1971 | Conterno | |
| 3,714,844 A | * | 2/1973 | Tsuda | 74/552 |
| 4,280,372 A | * | 7/1981 | Van Wicklin, Jr. | 74/552 |
| 5,925,314 A | * | 7/1999 | Nishiguchi et al. | 420/528 |
| 6,065,366 A | * | 5/2000 | Koyama et al. | 74/552 |
| 6,079,736 A | * | 6/2000 | Koide | 280/731 |
| 6,484,606 B1 | * | 11/2002 | Kreuzer | 74/552 |
| 2002/0011130 A1 | * | 1/2002 | Suzuki et al. | 74/552 |

FOREIGN PATENT DOCUMENTS

| | | | |
|---|---|---|---|
| DE | 1912534 | 10/1969 | |
| EP | 0050309 A1 | 4/1982 | |
| EP | 1000835 A2 * | 5/2000 | B62D/1/06 |
| GB | 980673 | 1/1965 | |
| JP | 60163765 A * | 8/1985 | B62D/1/04 |
| JP | 09039801 A * | 2/1997 | B62D/1/04 |
| JP | 2000085587 A * | 3/2000 | B62D/1/06 |

* cited by examiner

Primary Examiner—David A. Bucci
Assistant Examiner—Vicky A. Johnson
(74) Attorney, Agent, or Firm—Tarolli, Sundheim, Covell & Tummino L.L.P.

(57) ABSTRACT

The invention relates to a method of producing a vehicle steering wheel. The method comprises the following steps: a) a one-piece steering wheel skeleton having a hub, at least one spoke and a steering wheel rim is produced by one of casting and injection-molding, b) an intermediate layer made of soft foam is glued directly onto the steering wheel rim and c) the intermediate layer is covered with leather in that the leather is glued directly onto the intermediate layer. As an alternative working step, a cover consisting of an inner intermediate layer made of soft foam with an outer covering made of leather is glued with an inside directly onto the steering wheel rim. The invention further relates to a vehicle steering wheel produced by one of the methods.

13 Claims, 2 Drawing Sheets

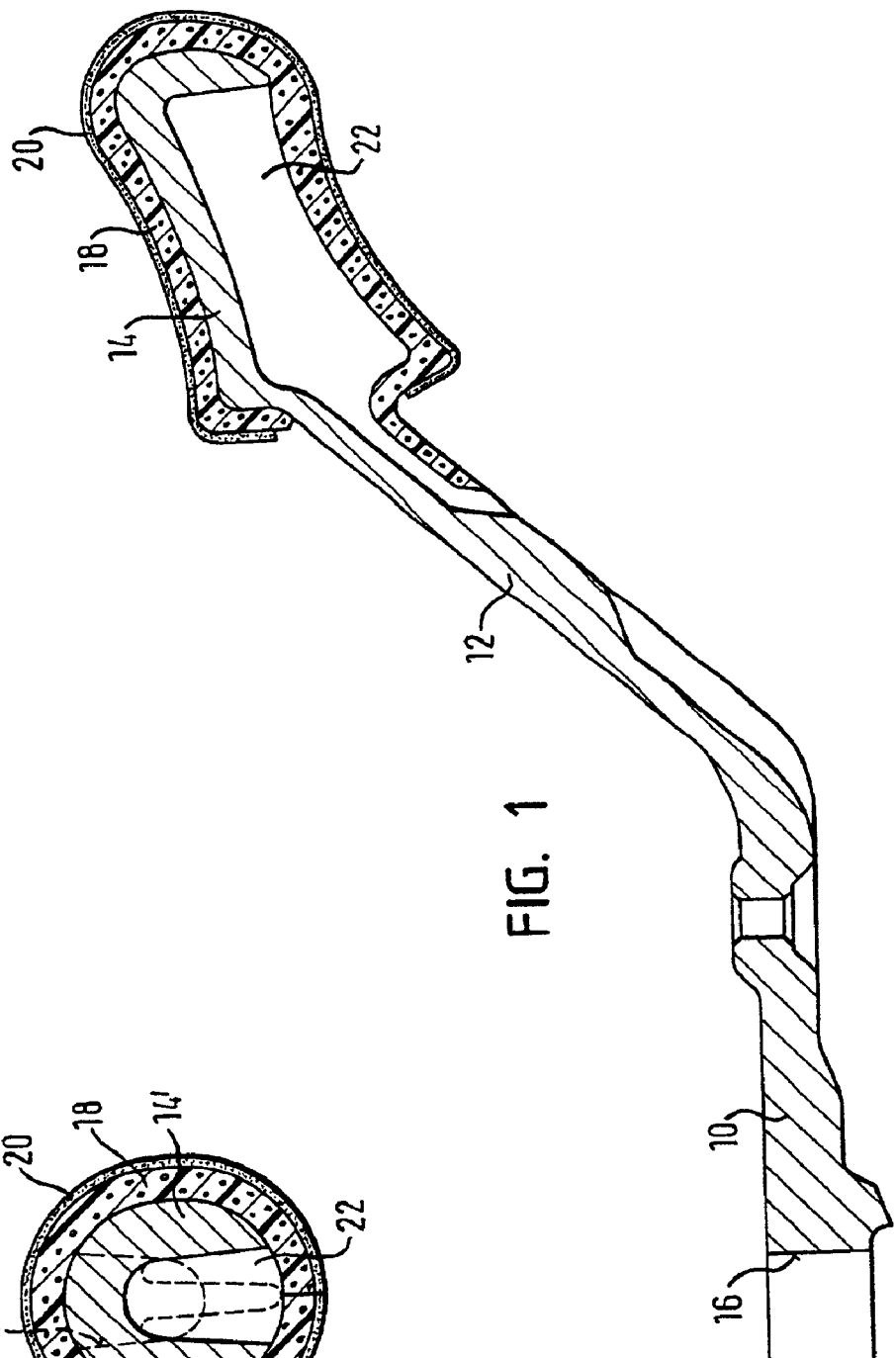

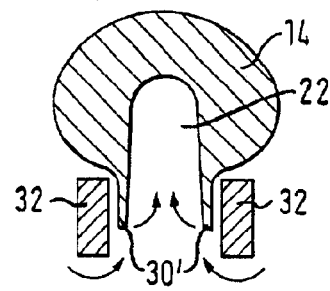
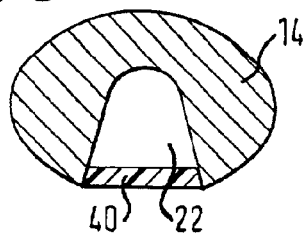
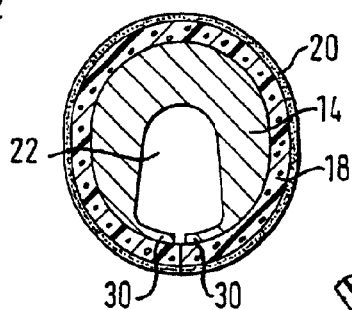
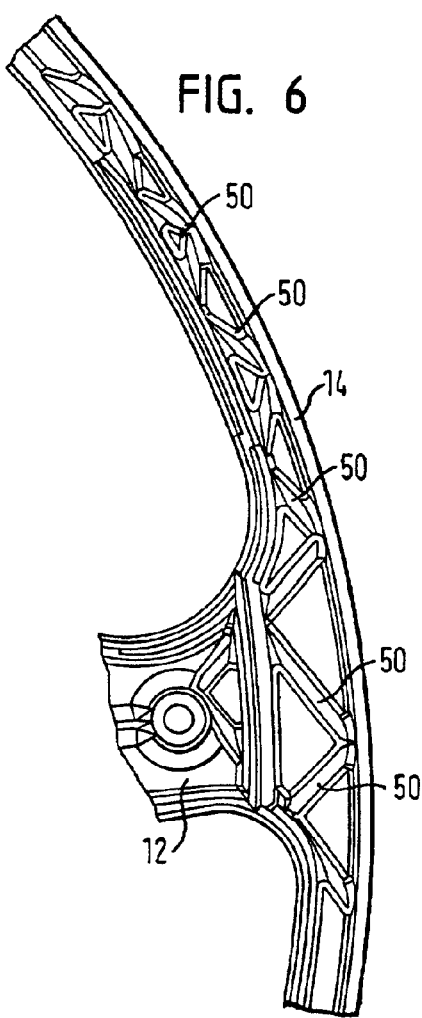
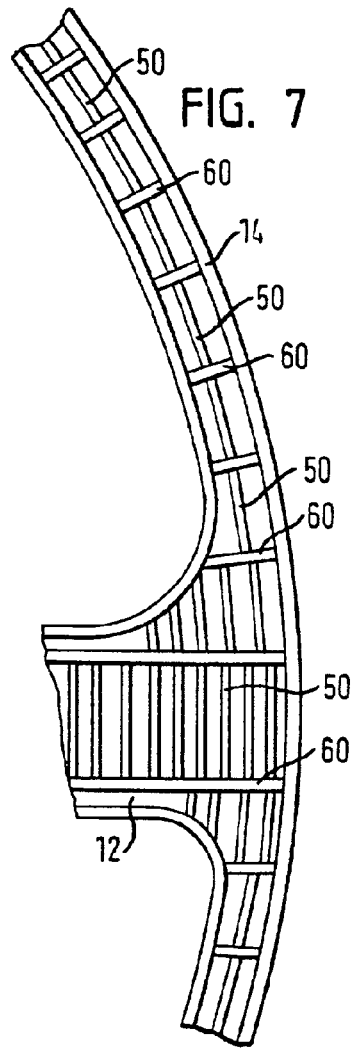

METHOD OF PRODUCING A VEHICLE STEERING WHEEL AS WELL AS A VEHICLE STEERING WHEEL

TECHNICAL FIELD

The invention relates to a method of producing a vehicle steering wheel as well as to a vehicle steering wheel produced by such a method.

BACKGROUND OF THE INVENTION

Vehicle steering wheels normally comprise a one-piece steering wheel skeleton having a hub, at least one spoke and a steering wheel rim. The skeleton of metal is foam-encapsulated in the area of the steering wheel rim and the spokes. The foam-encapsulation procedure is complex and requires precise foaming molds. Moreover, the foam-encapsulated skeleton still has to undergo a finishing step. German published examined application DE-AS 1,912,534 discloses a steering wheel skeleton that is not foam-encapsulated, but rather that is provided with a thick rubber covering in the area of the rim. However, the application and manufacture of this thick rubber covering, which has a profiled cross-section, are complex.

BRIEF SUMMARY OF THE INVENTION

The object of the invention is to provide a method that allows the production of inexpensive steering wheels which, especially haptically, are still pleasant for the driver to grip. Moreover, a vehicle steering wheel offering these advantages is to be provided.

The first object is achieved by a method comprising the following steps:

a) a one-piece steering wheel skeleton having a hub, at least one spoke and a steering wheel rim is produced by means of casting or injection-molding, b) an intermediate layer made of soft foam is glued directly onto the steering wheel rim and c) the intermediate layer is covered with leather in that the leather is glued directly onto the intermediate layer.

As an alternative, the first object is achieved by a method comprising the following steps:

a) a one-piece steering wheel skeleton having a hub, at least one spoke and a steering wheel rim is produced by means of casting or injection-molding, and b) a cover consisting of an inner intermediate layer made of soft foam and consisting of an outer covering made of leather is glued with its inside directly onto the steering wheel rim.

The above-mentioned second object, namely, the production of a vehicle steering wheel, is achieved with a vehicle steering wheel of the type described above in that the steering wheel rim is covered by a pre-manufactured intermediate layer made of soft foam and by leather, the intermediate layer being attached directly to the steering wheel rim and the leather being attached directly to the intermediate layer.

With the method according to the invention and the steering wheel according to the invention, foam-encapsulation of the steering wheel skeleton is no longer called for. On the contrary, the steering wheel rim is covered with the soft foam the outside of which, in turn, is adjacent to the leather. The soft foam gives the steering wheel rim the necessary soft but pleasant feel to the touch. Normally, the soft foam is stamped out of a flat, thin layer made of soft foam, that is to say, it is not pre-formed as a shell, which would make the production of the soft foam more expensive.

The steering wheel rim in the steering wheel according to the invention defines the outer geometry of the rim covered with leather and soft foam, something which is not provided for in the state of the art. On the contrary, in the state of the art, the foam-encapsulation or the shells that are attached to the skeleton are the part or parts that define the outer geometry of the steering wheel rim once the steering wheel has been completed. However, since the steering wheel rim of the steering wheel according to the invention, that is to say, the ring of the skeleton that forms the steering wheel rim, defines the outer geometry, said ring is much thicker than in the state of the art, since all that is necessary is to glue the thin intermediate layer made of soft foam and the leather onto it.

In order to reduce the weight of the steering wheel rim and thus the tendency of the steering wheel rim to vibrate and also in order to be able to change the vibration tendency by varying the weight, said steering wheel rim has to be provided with recesses according to the preferred embodiment, e.g. on the underside or else on the underside as well as on the opposite top. The intermediate layer bridges the recesses in such a manner and the recesses are so narrow that they cannot be felt by hand.

The steering wheel skeleton independently of whether manufactured by the process defined in claim 1 or 2 is preferably made by means of aluminum or magnesium pressure die-casting, which allows the requisite filigree shapes.

BRIEF DESCRIPTION OF THE DRAWINGS

FIG. 1 shows a cross-section through the right-hand half of a vehicle steering wheel according to the invention, which was made by means of the method according to the invention, FIG. 2 shows a cross-section through a steering wheel rim in accordance with a second embodiment of the steering wheel according to the invention, FIG. 3 shows a cross-section through the steering wheel rim in accordance with a third embodiment of the steering wheel according to the invention, FIG. 4 shows a cross-section through a steering wheel rim blank for a steering wheel according to the third embodiment, FIG. 5 shows a cross-section through the steering wheel rim in accordance with a fourth embodiment of the steering wheel according to the invention, FIG. 6 shows a cut-away bottom view of a steering wheel blank in accordance with a fifth embodiment of the steering wheel according to the invention, and FIG. 7 shows a cut-away bottom view of a steering wheel blank in accordance with a sixth embodiment of the steering wheel according to the invention.

DETAILED DESCRIPTION OF THE PREFERRED EMBODIMENTS

FIG. 1 shows a vehicle steering wheel that has a skeleton made in one piece by means of pressure aluminum or magnesium die-casting or injection molding and that consists essentially of three sections, namely a hub 10, several spokes 12 of which only one is shown, and a steering wheel rim 14 that is continuous in the circumferential direction. A bore 16 in the hub allows the mounting of the steering wheel onto a steering shaft (not shown). Since the geometry of the steering wheel in the area of the other spokes (not shown) is designed in the same way as the spoke 12 shown in FIG. 1 and since the spokes are uniformly distributed over the circumference, the half cross-section shown in FIG. 1 is sufficient to define the geometry of the steering wheel in the part of the steering wheel that is essential for the invention.

No shell-shaped injection-molded part or foam-encapsulated part is placed onto the steering wheel rim 14 of the skeleton, nor is the steering wheel rim 14 directly encapsulated by means of injection-molding or foaming. On the contrary, the steering wheel rim is covered with a pre-manufactured intermediate layer 18 made of soft foam and then, on the outside, leather 20 is attached onto the soft foam.

The intermediate layer consists of a soft foam sheet that is flat before it has been attached and that has a stamped contour. The thickness of this flexible sheet is constant. After the aluminum or magnesium pressure die-cast skeleton has been cast and deburred and, if necessary, mechanically reworked, the pre-manufactured intermediate layer 18 is glued directly onto the steering wheel rim 14.

Finally, in a subsequent working step, the stamped leather 20 is glued onto the outside of the intermediate layer 18.

As an alternative, it is also possible to attach the leather 20 and the intermediate layer 18 directly to each other before they are attached onto the steering wheel, resulting in a two-layered, flexible sheet the upper side of which is made of leather and the underside of which is made of soft foam. This unit is then glued directly onto the steering wheel rim 14.

Since the intermediate layer 18, like the leather 20, is very thin and flexible and has a constant thickness, the steering wheel skeleton, or to put it more precisely, the rim area of the steering wheel skeleton, also defines the outer geometry of the completely covered steering wheel rim that can be seen in FIG. 1.

In the area of the underside of the steering wheel rim, the skeleton has numerous, approximately 1 mm to 2 mm-wide, slit-shaped recesses 22 the main direction of extension of which lies transverse to the circumference, that is to say, in a radial section plane. Due to the recesses 22, the weight of the steering wheel rim 14 is considerably reduced. The recesses 22 cannot be felt from the outside because, between the recesses, radial webs remain, over which the intermediate layer 18 is applied.

In the embodiment shown in FIG. 2, in which only the steering wheel rim is shown at a place remote from the spoke, the steering wheel rim 14' is provided with a round outer geometry. On the underside, the steering wheel rim 14' has recesses 22', whilst the upper side likewise can have recesses 24 provided alternatingly with respect to the underside recesses 22'. With this embodiment as well, the steering wheel rim 14' is surrounded by the intermediate layer 18 having a constant thickness, the intermediate layer 18 made of soft foam being glued directly onto the skeleton. On the outside, the leather 20 is glued onto the intermediate layer 18.

As a result of the alternating upper side and underside recesses 22', 24, production by means of pressure die-casting is easier.

FIG. 3 shows a cross-section of a third embodiment through the steering wheel rim. Unlike the first two embodiments, the recesses 22 here are at least partially covered by small projections 30 on which the intermediate layer 18 rests. In this manner, wider recesses can be provided which nevertheless cannot be felt from the outside. The possibility of using wider recesses leads to a greater design freedom in terms of the variation of the weight and the tendency to vibrate.

The projections 30 can be easily obtained without an additional working step in that, during the injection-molding or casting, projections 30 are formed on the steering wheel rim 14 adjacent to the recesses 22 and then are deformed. FIG. 4 shows a steering wheel blank with formed-on projections 30' that extend approximately radially from the steering wheel rim. After the forming procedure, the steering wheel blank is placed into a deburring press that is indicated here by two punches 32. The punches 32 bend the projections 30' by about 90° so that they are located in the position shown in FIG. 3, in which they cover the recess.

FIG. 5 shows a cross-section of a fourth embodiment through the steering wheel rim. Similar to the third embodiment, the recesses 22 here are at least partially covered so that they cannot be felt from the outside. Unlike the third embodiment, however, separate inserts 40 or covers are used, which are placed into the recesses 22 and are jammed, for example, in the tapered recess. If necessary, the inserts 40 can completely close off the recesses 22.

FIG. 6 shows a bottom view of a steering wheel rim blank for a steering wheel according to a fifth embodiment. Unlike the first embodiment, in which the webs extend radially between the recesses 22, so-called cross-webs 50 are provided, that is to say, webs that intersect with at least one other web, for example, at the transition to the steering wheel rim.

FIG. 7 shows a bottom view of a steering wheel rim blank for a steering wheel according to a sixth embodiment. Here too, cross-webs 50 are used, but in this case they run in the circumferential direction and intersect radial webs 60 at regular intervals.

In the fifth as well as in the sixth embodiment, on the one hand, a suitable arrangement and dimensioning of the cross-webs 50 or else of the cross-webs 50 and the radial cross-webs 60 can influence the weight and the vibration tendency of the steering wheel rim 14 in the desired manner and, on the other hand, the size of the hollow spaces formed can be set in such a way that they cannot be felt from the outside. If desired, the projections known from the third embodiment or the inserts known from the fourth embodiment can also be used to cover the recesses formed between the webs. The webs can then serve as supports for the projections or inserts.

What is claimed is:

1. A method of producing a vehicle steering wheel, said method comprising the steps of:

a) producing a one-piece steering wheel skeleton having a hub, at least one spoke and a steering wheel rim by one of casting and injection-molding processes and not by securing separate parts together, and, forming recesses in the steering wheel rim during one of the casting and injection-molding processes, b) gluing an intermediate layer made of soft foam directly onto the steering wheel rim over the recesses, and c) covering the intermediate layer with leather by gluing the leather directly onto the intermediate layer.

2. The method according to claim 1, wherein said step of forming the recesses in the steering wheel rim includes the step of forming recesses on opposite sides of the steering wheel rim, with respect to a cross-section of the steering wheel rim.

3. The method according to claim 2, wherein said step of producing the one-piece steering wheel skeleton including the step of forming projections on the steering wheel rim which extend approximately radially with respect to the cross-section of the steering wheel rim.

4. The method according to claim 3, further including the step of bending the projections with a deburring press to cover the recesses, prior to said step of gluing the intermediate layer onto the steering wheel rim.

5. The method according to claim 1, wherein said step of producing the one-piece steering wheel skeleton includes a step of producing the steering wheel rim with a cross-section which defines a final outer geometry of a finished vehicle steering wheel, prior to performing said steps of gluing the intermediate layer and covering with leather.

6. The method according to claim 5, further including a step of selecting an intermediate layer made of soft foam having a constant thickness throughout and selecting leather having a constant thickness throughout, prior to performing said steps of gluing the intermediate layer and covering the intermediate layer with leather.

7. The method according to claim 1, wherein said step of producing the steering wheel skeleton by casting comprises one of an aluminum and magnesium pressure die-casting.

8. A method of producing a vehicle steering wheel, said method comprising the steps of:
 a) producing a one-piece steering wheel skeleton having a hub, at least, one spoke and a steering wheel rim by one of casting and injection-molding and not by securing separate parts together,
 b) forming projections on the steering wheel rim, the projections extending approximately radially with respect to a cross-section of the steering wheel rim, and
 c) gluing a cover consisting of an inner intermediate layer made of soft foam and an outer layer made of leather directly onto the steering wheel rim over the projections so that an inner part of the intermediate layer directly engages the steering wheel rim.

9. The method according to claim 8 wherein, said step of producing the steering wheel skeleton by casting comprises one of an aluminum and magnesium pressure die-casting.

10. A method of producing a vehicle steering wheel, said method comprising the steps of:
 a) producing a one-piece steering wheel skeleton having a hub, at least one spoke and a steering wheel rim by one of casting and injection-molding and not by securing separate parts together, and, forming recesses in the steering wheel rim during one of the casting and injection-molding processes, and
 b) gluing a cover consisting of an inner intermediate layer made of soft foam and an outer layer made of leather directly onto the steering wheel rim over the recesses so that the inner intermediate layer directly engages the steering wheel rim.

11. The method according to claim 10, wherein said step of forming recesses in the steering wheel rim during one of the casting and injection-molding processes includes steps of forming recesses on both an underside and a side opposite the underside of the steering wheel rim, with respect to a cross-section of the steering wheel rim.

12. The method according to claim 11, wherein the step of forming recesses includes a step of forming projections on the steering wheel rim which extend approximately radially with respect to the cross-section of the steering wheel rim.

13. The method according to claim 12, further including a step of bending the projections with a deburring press to cover the recesses, prior to said step of gluing the cover onto the steering wheel rim.

\* \* \* \* \*